(12) United States Patent
Bose (10) Patent No.: US 7,704,291 B2
(45) Date of Patent: Apr. 27, 2010

(54) METHANE GAS RECOVERY AND USAGE SYSTEM FOR COALMINES, MUNICIPAL LAND FILLS AND OIL REFINERY DISTILLATION TOWER VENT STACKS

(76) Inventor: Ranendra Bose, 14346 Jacob La., Centreville, VA (US) 20120-3305

( * ) Notice: Subject to any disclaimer, the term of this patent is extended or adjusted under 35 U.S.C. 154(b) by 0 days.

(21) Appl. No.: 12/500,814

(22) Filed: Jul. 10, 2009

(65) Prior Publication Data
US 2009/0321243 A1 Dec. 31, 2009

Related U.S. Application Data

(62) Division of application No. 11/394,576, filed on Mar. 31, 2006, now Pat. No. 7,591,866.

(51) Int. Cl.
*B01D 50/00* (2006.01)
(52) U.S. Cl. ............ 55/337; 55/317; 55/385.3; 55/404; 55/406; 55/409; 95/269; 95/270; 95/39
(58) Field of Classification Search ........... 55/337, 55/317, 385.3, 404–409, 400; 95/269, 270, 95/39
See application file for complete search history.

(56) References Cited

U.S. PATENT DOCUMENTS

| | | | |
|---|---|---|---|
| 2,789,032 A | | 4/1957 | Bagley et al. |
| 3,861,142 A * | | 1/1975 | Bose .................. 60/274 |
| 3,892,070 A * | | 7/1975 | Bose .................. 60/279 |
| 3,918,937 A | | 11/1975 | Holloway et al. |
| 4,235,845 A * | | 11/1980 | Bose .................. 422/171 |
| 4,399,107 A * | | 8/1983 | Bose .................. 422/170 |
| 6,398,851 B1 * | | 6/2002 | Bose .................. 95/273 |
| 2002/0020295 A1 * | | 2/2002 | Moredock ............ 95/269 |
| 2002/0033098 A1 * | | 3/2002 | Hiltunen ............. 95/269 |
| 2007/0231233 A1 * | | 10/2007 | Bose .................. 423/245.1 |

FOREIGN PATENT DOCUMENTS

| CA | 1030777 | 5/1978 |
|---|---|---|
| CA | 1104060 | 6/1981 |

* cited by examiner

*Primary Examiner*—Robert J Hill, Jr.
*Assistant Examiner*—Dung Bui (57) ABSTRACT

Ventilation Air Methane (VAM) exhaust gases from coal premine gob wells, land fills and oil refinery (Installations) vent stacks are used, after adequate compression, for energizing a high-speed gas turbine. The convoluting gas discharge causes a first separation stage by stratifying of heavier non-combustible and lighter combustible gas components that exit from the turbine in opposite directions, the heavier components having a second stratifying separation in a vortex tube to separate non-combustible, heaviest pollutants from non-combustible medium-heavy components. The noncombustible, medium components exit a vortex tube open end to atmosphere. The lighter combustible, pollutants (high purity Methane) effected in the first separation are piped to the Installation's engine air intake for re-combustion, thereby reducing the Installation's Methane pollution and improving its fuel economy. The non-combustible, heaviest pollutants from the second separation stage are piped to air filter assemblies. This gas stream convoluting at a high-speed through the top stator-vanes of the air filters, centrifugally separates the coalescent water, coal/carbon or silico-ethanes or sulfur particles, (PM) respectively, which collect at the bottom of the bowl, wherein it is periodically released to the site. Whereas, the heaviest gases: traces of hydrocarbons, carbon dioxide & micron size carbon, silico-ethanes or sulfur particles, respectively are released to the atmosphere.

17 Claims, 5 Drawing Sheets

METHANE GAS RECOVERY AND USAGE SYSTEM FOR COALMINES, MUNICIPAL LAND FILLS AND OIL REFINERY DISTILLATION TOWER VENT STACKS

CROSS-REFERENCE TO RELATED APPLICATIONS

This application is a divisional application of U.S. patent application Ser. No. 11/394,576, filed 31 Mar. 2006, now U.S. Pat. No. 7,591,866 the entire disclosure of which is hereby incorporated herein in its entirety by reference.

BACKGROUND OF THE INVENTION

The present Invention relates generally to a significant method for the purified recovery of CM Methane ($CH_4$) gas by its centrifugal separation from its very diluted concentration of 0.1~0.4% in underground Ventilation Air Methane (VAM), which is created by blowing an average 300,000 cubic feet/minute (CFM) air through the huge coal mining tunnels. This Ventilation System generates nearly 64% of coal mine methane emissions released, from most of the world's gassy coal mines. However, significant reduction in the ventilation air results in pockets of CMM of concentration of 5~15%, which create serious mine explosions and loss of life. Additionally, these diluted VAM gases are not easily combustible, and require significant pre-heating in catalytic beds, which are prohibitive in cost. Thus, the VAM gases are generally released to atmosphere, causing serious long term Global Warming phenomenon.

Figure 1:
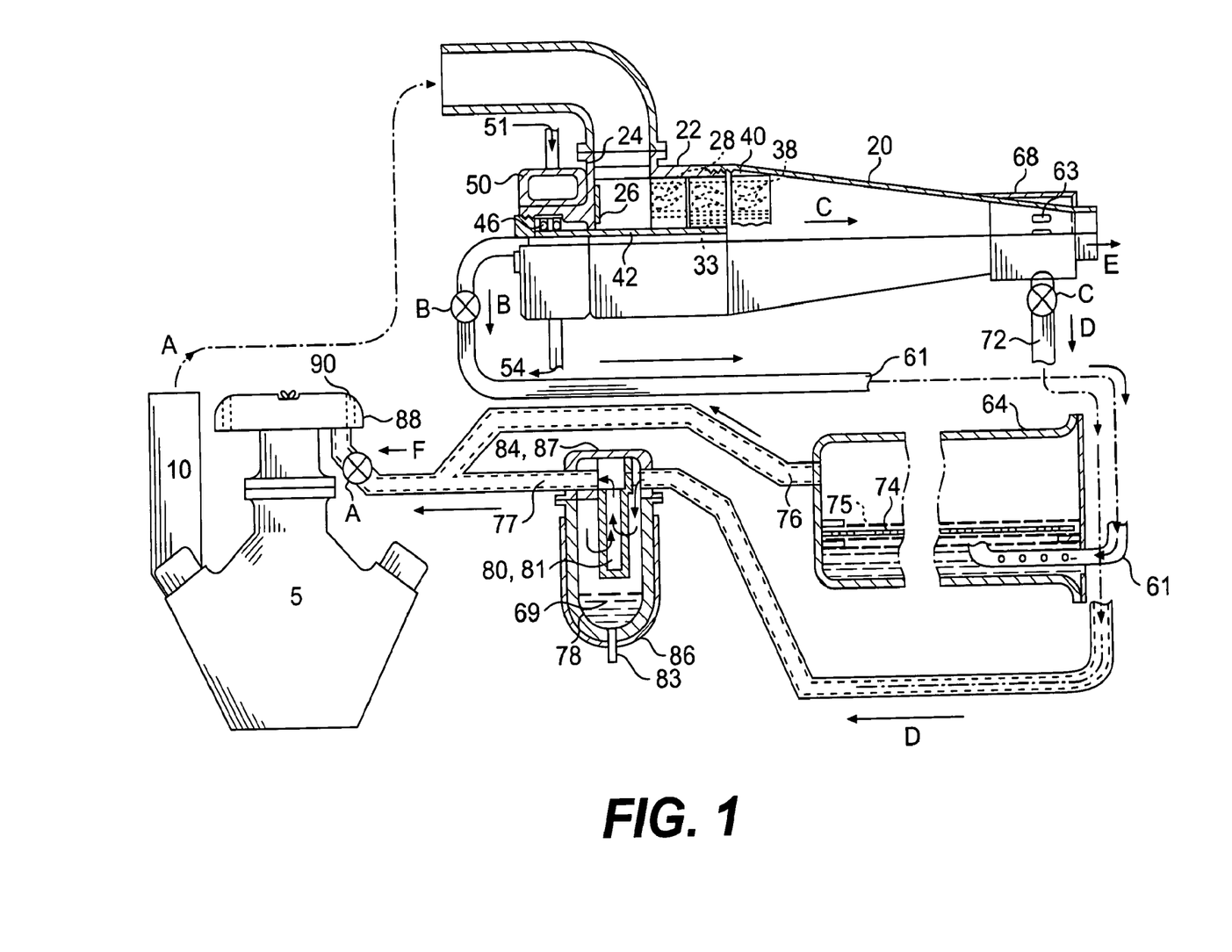
FIG. 1, 1(A), 1(B), 1(C): are diagram illustrations of the overall System, its main components as installed on a Gob Well Stack of Coal Mines; L and Fill; Refinery Stacks.
Figure 1A:
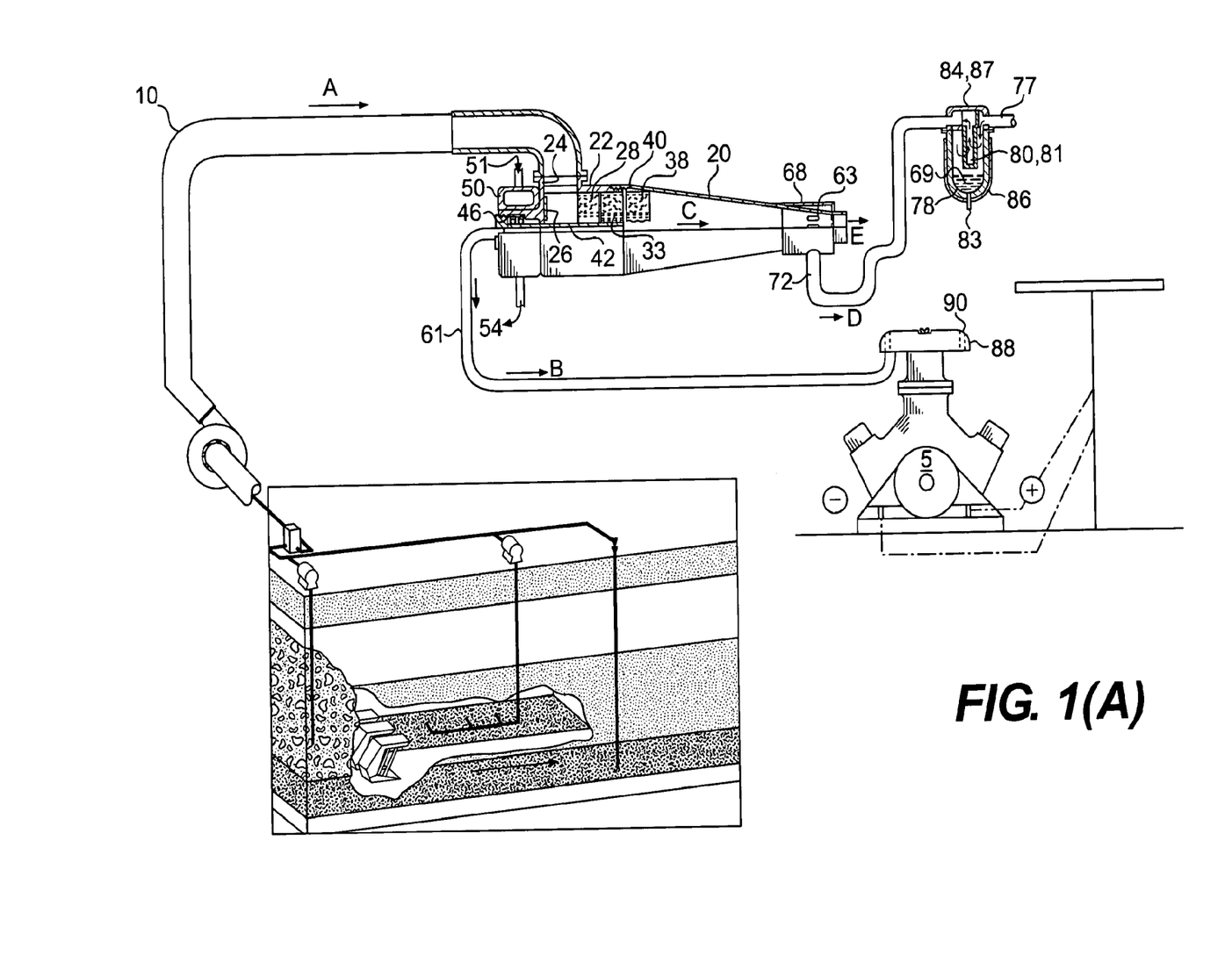
Figure 1B:
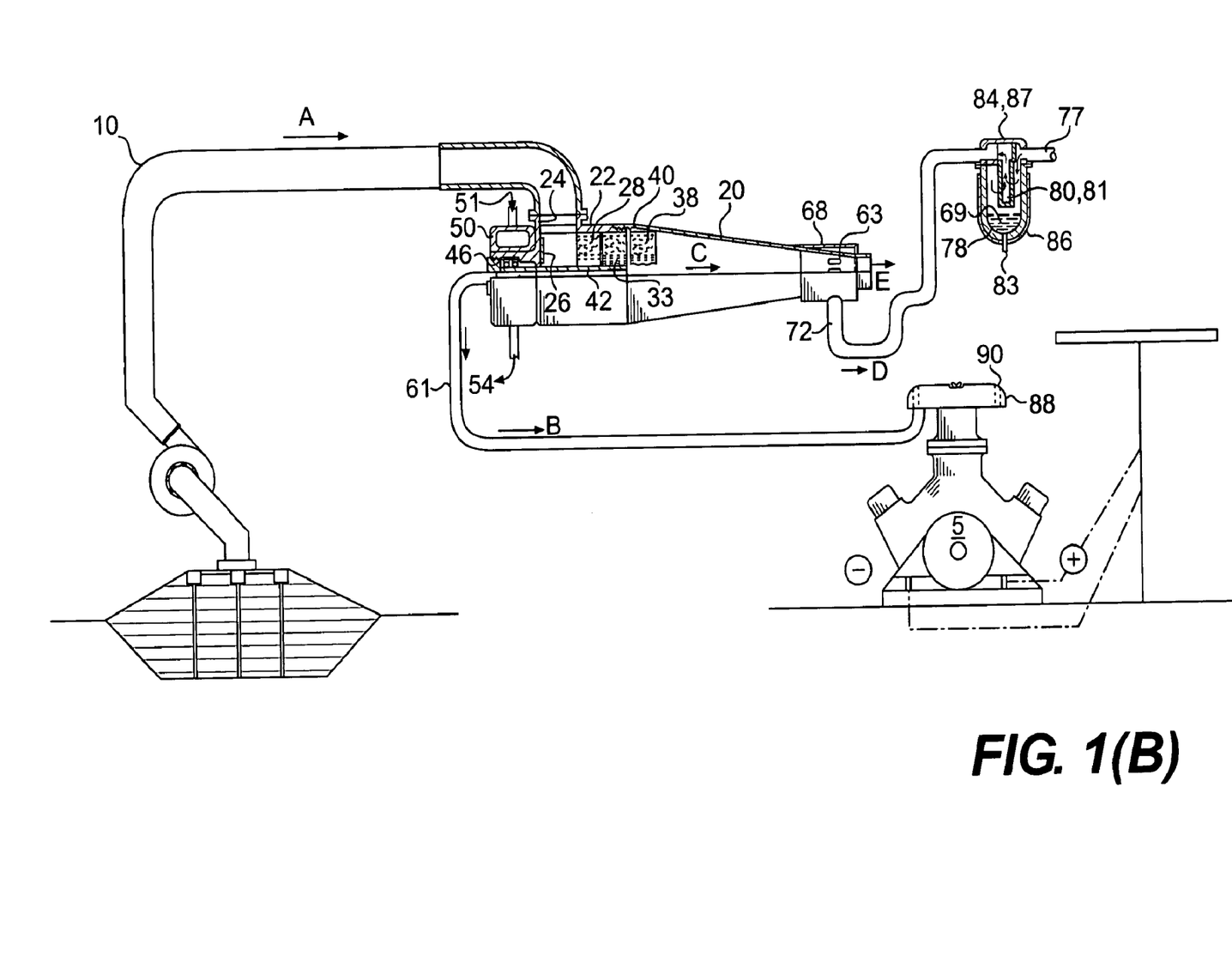
Figure 1C:
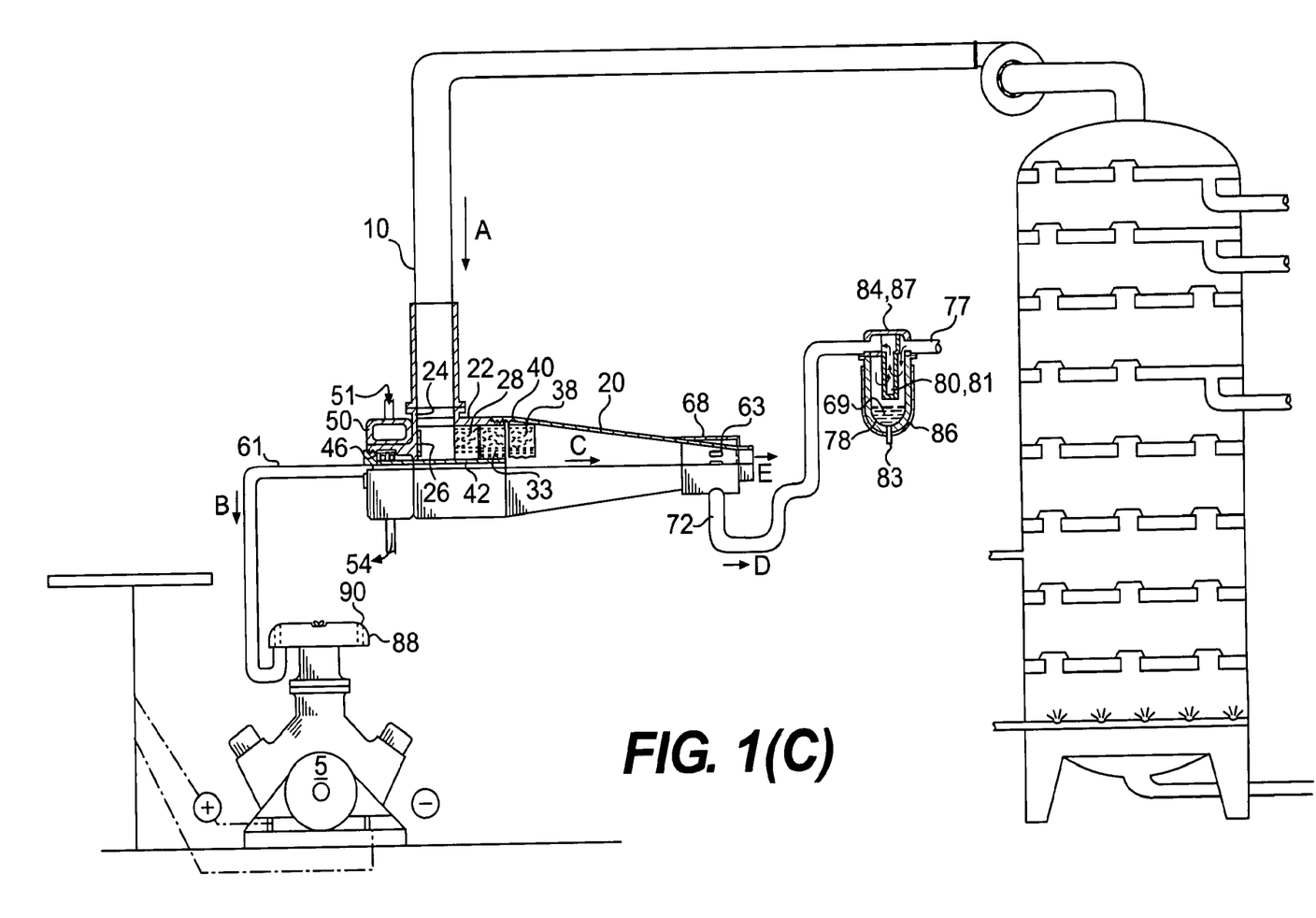

Hence, the use of the Bose System modified to incorporate a Gas Compressor between the Bose System and the VAM pipeline, see FIG. 1(A): for the Pre-mining Coalmine's Gob-Well; FIG. 1(B): for Land Fill; FIG. 1(C) for Oil Refinery; provides a consistent CMM gas pressure, required for the high speed operation of the Bose gas turbine. This results in the recovery of 30~95% purity of Methane gases. These gases could be injected into the natural gas pipelines, or burnt in natural gas-engine driven, Generators, to produce electrical energy for the coal mine's, landfills, refinery use or distributed to the Community electrical grid, at a significant Return on Investment (ROI).

FIELD OF THE INVENTION

Methane Emissions as a Global Warming & Heat Trapping Gas:

The role of Carbon Dioxide ($CO_2$) in the atmosphere as a heat trapping medium which causes 74% of the global warming phenomenon is well-known. However, not so well known is the significant contribution of 16% global warming by Methane ($CH_4$) gas released to the atmosphere, by a variety of natural and human-related sources. The latter sources include landfills, natural gas and petroleum systems, agricultural activities, coal mining, stationary and mobile combustion, wastewater treatment and certain industrial process. In the US, coal mines account for about 10% of all man-made methane emissions. These emissions are more potent than $CO_2$ as methane exists in the atmosphere for 9~15 years. As a greenhouse gas, it is 21 times more effective in heat trapping than carbon dioxide over a 100 year period. Also, methane is a primary constituent of natural gas and is an important source of energy, having a heat (calorific) value of 1000 BTU/cf. Thus, efforts to prevent or utilize methane emissions can provide significant energy, economic and environmental benefits.

Methane gas and coal are formed simultaneously during coalification, a process in which biomass is converted by biological and geological processes into coal. Methane is stored within coal seams and the rock strata surrounding the seams. Methane is released when pressure within a coal bed is reduced as a result of natural erosion, faulting or mining. In underground mines, methane poses a serious safety hazard for miners because it is explosive in low concentrations (5~15% in air). In the U.S., methane concentration in the mine working areas can not exceed 1% and other locations 2% respectively. This Coal Mine Methane (CMM) can be solely controlled through the use of very large, high energy Ventilation Air System (VAS), which pumps from 100,000~3,000,000 cfm air through the coal mine tunnels, giving methane concentrations of 0.1~0.79%. This data and other Mining facts mentioned in this application are extracted from Reference #1: US EPA Report No: EPA 430-K-04-003 dated Jul. 2004, entitled "Identifying Opportunities for Methane Recovery at U.S. Coal Mines: Profiles of Selected Gassy Underground Coal Mines: 1997~2001."

Methane Drainage Techniques:

Drainage Methods include (a) Vertical Pre-mine wells, (b) Vertical Gob wells, (c) Long hole, horizontal bore holes, (d) Horizontal and Cross-measure Bore holes. Vertical Pre-Mining Wells: are the optimal method for recovering high quality gas from the coal seam before the mining operations begin. These are similar in design to oil and gas wells. These are drilled into the coal seam several years in advance of mining. Vertical wells require hydraulic or nitrogen fracturing of the coal seam to activate the flow of methane, usually of around 90% purity when new, degrading to 20% or less in a few years. These wells generate from 50% to over 70% methane that would otherwise be emitted during mining operations, if they are drilled 10 years in advance. These gases are blended with pure Natural gas, in order to conform to at least 95% methane concentration and no more than 2% of incombustible gases (such as, carbon dioxide, nitrogen and hydrogen sulfide) for pipeline sales.

DESCRIPTION OF THE RELATED ART

Ventilation Air Methane Use Technologies:

Ventilation air methane (VAM) is now recognized as an unused source of energy and a potent atmospheric greenhouse gas (GHG). A host of recently introduced technologies can reduce ventilation air methane emissions, while harnessing methane's energy, and can offer significant benefits to the world community. Reference 1 identified two technologies for destroying or beneficially using the methane contained in ventilation air: the VOCSIDIZER, a thermal flow-reversal reactor developed by MEGTEC Systems (De Pere, Wis., United States), and a catalytic flow-reversal reactor developed expressly for mine ventilation air by Canadian Mineral and Energy Technologies (CANMET—Varennes, Quebec, Canada). Both Trademark technologies employ similar principles to oxidize methane in mine ventilation airflows. Based on laboratory and field experience, both units can sustain operation (i.e., can maintain oxidation) with ventilation air having uniform methane concentrations down to approximately 0.1 percent. For practical field applications where methane concentrations are likely to vary over time, however, this analysis assumes that a practical average lower concentration limit at which oxidizers will function reliably is 1.5 percent. In addition, a variety of other technologies such as boilers, engines, and turbines may use ventilation airflows as combustion air. At least two other technology families may also prove to be viable candidates for beneficially using VAM. These are VOC concentrators and new lean fuel gas turbines.

Thermal Flow Reversal Reactor

The equipment for a Thermal Flow Reversal Reactor (TFRR) consists of a bed of silica gravel or ceramic heat-exchange medium with a set of electric heating elements in the center. The TFRR process employs the principle of regenerative heat exchange between a gas and a solid bed of heat-exchange medium. To start the operation, electric heating elements preheat the middle of the bed to the temperature required to initiate methane oxidation (above 1,000° C. [1,832° F.]) or hotter. Ventilation air at ambient temperature enters and flows through the reactor in one direction and its temperature increases until oxidation of the methane takes place near the center of the bed. The hot products of oxidation continue through the bed, losing heat to the far side of the bed in the process. When the far side of the bed is sufficiently hot, the reactor automatically reverses the direction of ventilation airflow. The ventilation air now enters the far (hot) side of the bed, where it encounters auto-oxidation temperatures near the center of the bed and then oxidizes. The hot gases again transfer heat to the near (cold) side of the bed and exit the reactor. Then, the process again reverses. TFRR units are effectively employed worldwide to oxidize industrial VOC streams.

Catalytic Flow Reversal Reactor

Catalytic flow reversal reactors adapt the thermal flow reversal technology described above by including a catalyst to reduce the auto-oxidation temperature of methane to as low as 350° C. [662° F.]). CANMET has demonstrated this system in pilot plants and is now in the process of licensing Neill & Gunter, Dartmouth, Nova Scotia, to commercialize the design (under the name VAMOX). CANMET is also studying recovery options for profitable turbine electricity generation injecting a small amount of methane (Gob gas or other source) increases the methane concentration in ventilation air can make the turbine function more efficiently. Waste heat from the oxidizer is also used to preheat the compressed air before it enters the expansion side of the gas turbine.

Energy Conversion from a Flow-Reversal Reactor

There are several methods of converting the heat of oxidation from a flow-reversal reactor to electric power, which is the most marketable form of energy in most locations. The two methods being studied by MEGTEC and CANMET are:

Use water as a working fluid. Pressurize the water and force it through an air-to-water heat exchanger in a section of the reactor that will provide a non-destructive temperature environment (below 800° C. [1472° F.]). Flash the hot pressurized water to steam and use the steam to drive a steam turbine-generator. If a market for steam or hot water is available, send exhausted steam to that market. If none is available, condense the steam and return the water to the pump to repeat the process.

Use air as a working fluid. Pressurize ventilation air or ambient air and send it through an air-to-air heat exchanger that is embedded in a section of the reactor that stays below 800° C. (1472° F.). Direct the compressed hot air through a gas turbine-generator. If gob gas is available, use it to raise the temperature of the working fluid to more nearly match the design temperature of the turbine inlet. Use the turbine exhaust for cogeneration, if thermal markets are available.

Since affordable heat exchanger temperature limits are below those used in modern prime movers, efficiencies for both of the energy conversion strategies listed above will be fairly modest. The use of a gas turbine, the second method listed, is the energy conversion technology preferred for economic reasons. At a VAM concentration of 0.5 percent, one vendor expects an overall plant efficiency in the neighborhood of 17 percent after accounting for power allocated to drive the fans that force ventilation air through the reactor.

Other Technologies

USEPA has also identified other technologies that may prove able to play a role in and enhance opportunities for VAM oxidation projects. These are briefly described below.

Concentrators

Volatile organic compound (VOC) concentrators offer another possible economical option for application to VAM. During the past 10 years the use of such units to raise the concentration of VOCs in industrial-process air exhaust streams that are sent to VOC oxidizers has increased. Smaller oxidizer units are now used to treat these exhaust streams, which in turn has reduced capital and operating costs for the oxidizer systems. Ventilation air typically contains about 0.5 percent methane concentration by volume. Conceivably, a concentrator might be capable of increasing the methane concentration in ventilation air flows to about 20 percent. The highly reduced gas volume with a higher concentration of methane might serve beneficially as a fuel in a gas turbine, reciprocating engine, etc. Concentrators also may prove effective in raising the methane concentration of very dilute (0.4%) VAM flows to 1.6%, that will support oxidation in a TFRR or CFRR. (Italics added for emphasis, as my new invention better fulfills this Concentrator need)

BRIEF SUMMARY OF THE INVENTION

Among the several objects and advantages of the present invention may be noted:

the prevention of atmospheric pollution by methane ($CH_4$), ethane ($C_2H_6$), carbon dioxide ($CO_2$) and coal particles here to fore emitted in significant proportions from the exhaust gases of Pre-mine bore holes and In-mine Gob Wells, and Ventilation Air Stacks of underground Coal mines;

the provision of a new and improved apparatus for separating the different gaseous and particle components constituting the exhaust gas emission from underground coal mines for the purpose of appreciably reducing the proportion of harmful and, or pollutant gases/particles being present in such gases which are emitted into the atmosphere;

the provision of an improved apparatus for separating gases/particles in a gas/particle mixture having different molecular weights/densities, which is compact, continuously operative, inherently reliable and may be simply and inexpensively manufactured and retrofitted to all in-use coal mines' Gob Wells and Vent Air stacks;

the provision of a novel and improved apparatus which may be universally applied for separating the combustible gases/particles from the noncombustible gases/particles in the exhaust gas being emitted from any type of Municipal Landfill, Oil Refinery Fractionating Tower Vent gas burner, engine or turbine and which increases the thermal efficiency of the same by permitting the return of the combustible gases/particles to the burner for subsequent re-combustion.

In accordance with the teachings of the present invention, it has been found that the foregoing objects and their attendant advantages can be realized with a conventional Pre-mine/In-mine Gob Well and Vent Air stacks, as is used in existing coal mines, and hereinafter referred to as "Methane Outlets (MO) ", by providing an anti-exhaust gas pollution and thermal regenerative device having no moving parts and which, when connected to the "Methane Outlets (MO)", operates automatically to substantially separate the heavier incombustible, components from the lighter combustible component of the outlet gas, and recycles the lighter, combustible components, causing the same to be directed back into the air-intake of the engine/turbine for further or complete combustion.

Since the "Methane Outlet" gases are substantially being released at atmospheric pressure, the teachings of the present invention requires the retrofit of an electrically driven, variable flow, adjustable discharge pressure Gas Compressor(s) of either centrifugal or rotary screw type with each device or a plurality of devices, as may be required to fully energize these devices.

This device simply comprises an elongate converging, vortex tube which terminates in a small discharge outlet at one end and fitted with a down-stream stator wheel, at its large junction end with the cylindrical housing of the turbine impeller and immediately adjacent to the impeller. A suitable support for the impeller is provided on a hollow axial rotary shaft, extending up to the large end of the vortex tube and exteriorly of the cylindrical housing carried on high temperature/high speed ball bearings, or magnetic or air bearings, within the cylindrical housing, the outer end of which is fashioned into an annular chamber for the circulation of the bearing's cooling water from the System's gas engine-radiator. An upstream stator wheel is mounted to the inside of the cylindrical housing of the turbine impeller and immediately ahead of it. An inlet pipe is arranged and disposed near the closed, wall end of the cylindrical turbine housing for discharging the "Methane Outlet" gases from the coal mine tangentially, or peripherally therein.

As the pressurized "Methane Outlet" gas is introduced through the inlet pipe, it is directed through the upstream stator wheel for reducing the gas turbulence before its impact on the turbine impeller blades. The expansion of the gas through the turbine blades causes the turbine to speedup considerably, which increases the speed of the exhaust gas mass passing there through into the downstream stator wheel and into the conical vortex tube, wherein the convoluting gas mass is centrifugally stratified into three layers, in accordance with their molecular weights: the inner core comprises of the lighter combustible Methane gases (molecular wt=16) which are fed back through the hollow shaft of the gas turbine to the air/fuel intake of the gas engine/turbine, prior to their re-combustion in the engine/turbine; the middle layer comprises impurities: nitrogen ($N_2$~mol. wt=28), ethane ($C_2H_6$~mol. wt=30) gases and air (mol. wt=28.5) which exit to the atmosphere through the small end of vortex tube; the outermost layer comprises the heavier non-combustible carbon dioxide ($CO_2$~mol. wt=4) gases and carbon particles ($C_2$) which are separated through elongated, radial slots milled at the smaller end of the vortex tube and collected in the second separation stage chamber. The particles being solid, falls by gravity to the chamber bottom and are removed. The $CO_2$ is released to the atmosphere.

The present invention incorporates the technology for reducing the "drop-out" amount of the carbon or other particles (PM) in the second separation stage chamber by (a) milling the radial slots of the vortex tube end at a tilt angle 30 degrees to vertical, with the tilt conforming towards the gas exit pipe of said second separation stage chamber, (b) by applying an industrial friction reducing, high temperature, abrasion-resistant coating to the said chamber's inside surface. Additionally, the present invention incorporates the use of a plurality of compressed air in-line filter assemblies as an improved apparatus than the chemical chambers of my prior Art, but shown in FIG. 1 of my prior U.S. Pat. No. 6,398,851 B1 dated Jun. 4, 2002, for the removal of water vapor and carbon particles from the separated Methane and Carbon dioxide gas streams separated from the Outlet gas stream of the Pre-mining or In-mining Gob Well or Ventilation Air Stacks of existing underground Coal Mines. This Carbon and water vapor removal is effected by their centrifugal dispersal and selective removal by the passage of these separated gases through the top stator vanes/porous elements of the said plurality of air filter assemblies.

BRIEF DESCRIPTION OF THE DRAWINGS

The present invention is shown in the accompanying drawings wherein.

DETAILED DESCRIPTION OF THE INVENTION

The Methane recovery and usage system for the present invention may be used on existing underground coal mines' gob well or land fill or refinery stacks, (herein after referred to generally as mine stacks), as illustrated in FIGS. 1(A), 1(B), 1(C). The alphabetical reference characters A-E designate the gases or gas mixtures as follows:

A: Exhaust from the mine, landfill or refinery stacks' gas mixture of combustible, non-combustible gases, and carbon or silicoethane or sulfur particles feed to rotate the turbine.

B: Lighter inner core of gas mixture comprising primarily combustible gas: methane, are fed into the air intake of the natural gas engine or gas turbine.

C: Heavier of the heavy outer layer of gas mixture of combustible and non-combustible gases, such as, carbon dioxide and carbon or silicoethane or sulfur particles and the lighter of the heavier gases: nitrogen, dilution air, water vapor with traces of ethane.

D: Substantially, a mixture of the heavier of the heavy gases, as above. These gases are passed through a plurality of compressed air filter, for the collection of coal or other particles listed, prior to the release of the carbon dioxide gases to the atmosphere.

E: Substantially, a mixture of the lighter of the heavier gases, such as nitrogen, dilution Air, water vapor, carbon monoxide, traces of ethane are released to the atmosphere.

In FIG. 1(A) of the drawing, the exhaust Methane Outlet (MO) of Gob Well 5 connects via CF Gas Compressor 10($a$) and its discharge pipe 10 to the inlet at the larger end of the vortex tube 20, this being a cylindrical housing 22 to which the vortex tube connects, and having entry port 24 connecting to pipe 10. Within such housing is a heat shield 26 and stator wheel 28 secured upstream of turbine impeller wheel 33, downstream of which is a further stator wheel 38 located at the larger end of the vortex tube and secured by welding as at 40.

A suitable support for the impeller is provided on a hollow steel axial rotary shaft 42 extending up to the large end of the vortex tube and exteriorly of the cylindrical housing carried on a pair of high temperature/high speed, steel ball bearings, (alternatively an air bearing or magnetic bearing may be used, if higher turbine rotary speed is required and a higher cost is permissible) 46, within the cylindrical housing of the outer end of which is fashioned into a hub from which radially extends the engine radiator-water cooled Housing 50, water pipes 51,54.

The cylindrical housing may, as shown, be a single integral aluminum casting along with the exhaust gas inlet port 24. The stator wheel 38 can be fixed inside the front end of vortex tube in any obvious manner, as by welding, shrink or force fitting, splining.

It will be apparent from the above description that exhaust gases from pipe 10 in the direction of Arrow A, enter stator wheel 28 where they are deflected to smoothly pass through to the impeller 33 effecting rotation of the impeller carried on the bearings 46 via shaft 42. In this instance, the gases enter into the impeller and emerge from the stator 38 spinning in a direction to centrifugally stratify in the vortex tube 20. Thus, the core of the lighter gas mixture passes reversely through the hollow shaft 42, in the direction Arrow B, through pipe 61 and introduced to bottom of the air filter housing 88,90. This effects the First Separation Stage components as installed on a coal mine Ventilation Air or Gob Well Stack, or Municipal Landfill or Oil Refinery Stack.

However, the mixture of heavier gases moves in the direction of Arrow C and, still rotating upon reaching the outer smaller end of the vortex tube 20, the heaviest incombustible gases, comprising the heavier carbon dioxide gases and particulates (PM) exhaust emerge through the ports 63 into the Second Separation Stage chamber 68 and then via pipe 72 in the direction of Arrow D to the "Compressed Air Filter Assembly" 87. The lighter of the heavier gases (nitrogen, traces of ethane and dilution air) are exhausted to the atmosphere at the end of the vortex tube, see Arrow E.

The present invention has overcome the carbon/coal, or silicoethane or sulfur particulate (PM) emission problem by substituting a plurality of specially selected, in-line air filter assemblies normally used for separating the water vapor and particles from compressed air supply. See FIG. 1, Items 84 & 87. This Assembly comprises of an aluminum body consisting of inlet port and outlet port of ½" NPT screwed orifice to attach to pipe 72 and 77 conveying the separated heavier carbon dioxide gases and carbon particles in gas stream D. As this stream flows at a high speed, into the polycarbonate bowl 78 of the air filter assemblies, it convolutes through its top stator vanes prior to flow through the 25~40 micron size holes in the polypropylene filter elements (Items 80 & 81) of the filter assemblies. Such convolutions drop the heavy carbon/other particles over 40 microns as it coalesces with the water vapor droplets, 69 into the bottom of the bowl, but allowing the carbon dioxide gas, to flow through the filter element pores and release to the atmosphere. Whereas, the carbon particles (PM) are collected in the bowl and periodically discharged to the mine surface by means of an automatic, preset valve 83.

The air filter assemblies are designed to operate with compressed air supply at up to 125 F temperature, 150 psig pressure and 75 scfm or larger flow rate. The operating parameters are within the requirements of the present invention. This method of Differential Separation of carbon particles and water vapor from carbon dioxide gas by the use of air filter assembly 'elements' of varying porosity is a novel process, which will be one of the claims of this improved invention. However, the construction of this filter assembly will be of no patentable moment herein.

Referring back to the stator 28, the placement of such a stator before a turbine impeller is of conventional practice. However, the placement of the stator 38 down stream of the impeller 33, while of apparent conventional practice, is by no means for conventional effect found in gas turbines. Experimentation and testing brought to light the puzzling effect that the lighter gases through the pipe 61 were being slowed up for some reason or other at an engine speed of about 1300 rpm. in at least two different test automobiles. It was ultimately discovered that the rotating gas mass leaving the turbine impeller blades was spinning in a direction opposite to the rotational direction of the impeller. It was further found that such opposite directional rotation was slowing down the lighter combustible gas mixture passing through pipe 61. Accordingly, in order to prevent such opposite rotation of a gas mixture leaving the turbine impeller, the stator 38 was added in order to redirect such gas mixture in to the same rotational direction as the impeller. The result produced was that the passage of gas mixture in the core of the whirling mass in the vortex tube faced lesser flow resistance in passing through the sleeve 42. Thus, the slow-down of gas flow in pipe 61 was alleviated. A further beneficial effect was found in the addition of the stator 38, in that it improved the separation quantity of the lighter gas mixture passing from the vortex tube through the hollow shaft 42 and likewise increased the quantity of heavier gas mixture passing toward the second separation stage 68. This is attributed to the increased conversion of exhaust gas pressure energy into higher velocity energy effected by the presence of the stator 38. Thus, an overall improved separation effect was noted.

While still on the subject of the turbine, and whereas in my prior patent it was stated that the impeller should have a number of blades equal to the number of cylinders in the engine or a multiple thereof, it has now been ascertained that, by using a multiple of two, the impeller speed for a particular exhaust velocity is considerably increased. Thus, an actual experimentation with an eight-cylinder engine, it has been found that providing sixteen blades on the impeller considerably enhanced the rotational speed of the gases passing there through. Also, by virtue of the stator 38 which prevented the opposite rotation of such gases with regard to the turbine impeller, the greater rotational speed produced a stronger centrifugal separating effect between the heavier and lighter gas components.

Based upon this knowledge, the present invention will develop matching gas turbine cross-sections with 16 to 24 blade design, to suit the respective coal mine Gob Well/Ventilation Air stack, or Land Fill or Oil refinery Stack's, air flow rates.

Finally, the Methane gas recovered from the Mine Stacks and purified in the Bose System as described above, is conveyed through pipe 61 for its re-cycling into either the turbine air intake or gas-engine's air intake manifold 90. The Methane gas is sucked in by virtue of the engine/turbocharger air intake vacuum and burnt with significant reduction of atmospheric pollution and energy cost savings. An alternate method of gas input to the engine air intake could be through a vacuum control valve operated by engine manifold vacuum and set to open for recycled gas flow to the engine at between 13" and 16" of vacuum. Various other arrangements can also be made.

Although U.S. Pat. Nos. 4,399,107 and 4,235,845 had used air-fins (Item 50, FIG. 1) for cooling the high-temperature ball bearings of the turbine's hollow shaft, it was found that air cooling was insufficient to prevent the relative expansion of the steel hollow shaft within its ball bearing sleeves, thereby changing its operating clearances. This change in assembly clearance caused the turbine to slow down at peak exhaust gas flow, reducing the system's gas separation efficiency. Also, it caused the ball bearing to "seize up" after 25,000 miles of service runs. In order to guarantee a 50,000 miles service life for this invention, an improved engine radiator water cooled housing has also been included in the present invention (See FIG. 1, Item 50). Additionally, the impeller and stator wheels are of the shrouded type as used in prototype experiment and testing: ref U.S. Pat. No. 6,398,851.

Past experimentation with the prior art of this invention on an automobile using leaded gasoline confirmed significant centrifugal separation of lead particles from the main exhaust gas stream into the separated heavier pollutant gas stream. Also, significant amounts of lead particles dropped out inside the second separation stage chamber (FIG. 2A, Item 68), due to the radial nature of discharge of the separated solid particles caused because of radial slots provided in my prior art described in U.S. Pat. No. 3,861,142. The radially discharged particles impinged perpendicularly on the inside surfaces of the said separation chamber and bounced back radially, rather than follow an orderly convoluting gas flow around the chamber.

Figure 2A:
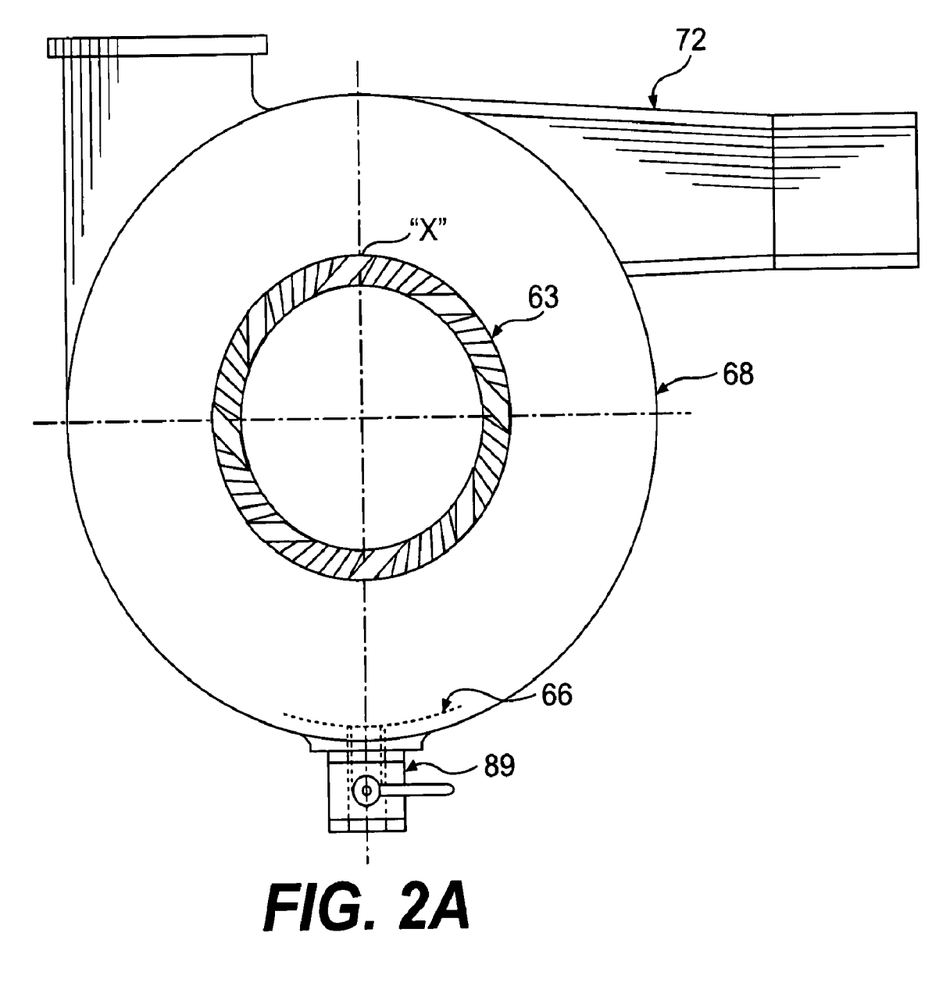
FIG. 2(A): is the cross-sectional end view of the Second Separation Chamber of the System's conical vortex tube located at its smaller end.

It was discovered that the application of an Industrial low-friction, high-temperature, abrasion resistant, thermosetting and organic coatings, (Item 66) made on the inside surfaces of said chamber (Item 68) can significantly reduce the lead, carbon and other solid particles' dropout and increase their transport down stream via delivery pipe (Item 72). Refer to: Modern Manufacturing Process Engineering, by B. W. Niebel, McGraw Hill, 1989, Tables 15.2 and 15.3. for specifications and properties of possible Industrial coatings.

This enhanced separation efficiency due to the discovery of said Industrial coatings would be applicable to carbon/coal or silicoethane or sulfur particulate treatment in the Coal mines, or Municipal Landfills or Petroleum Oil Refinery Stack Applications, respectively. This feature of the present invention is based on the advantage accruing from the principle of "stream-lined flow of gases" and allows the carbon/coal, or silico-ethane or sulfur particles with the separated heavier gases from the second separation stage to collect efficiently in the delivery pipe (Item 72) for their transmittal to the air-filter assemblies. This feature of my present invention is one of the important claims.

Figure 2B:
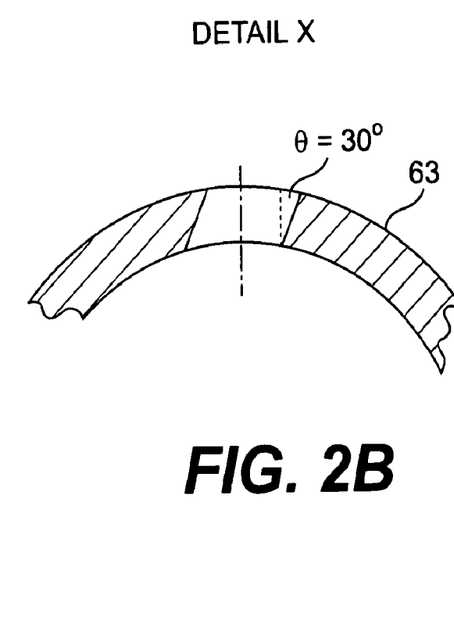
FIG. 2(B): is the cross-sectional detail of the vortex tube small end, radial slots.

Additionally, it was discovered that changing the location of the delivery pipe (Item 72) to a tangential position on the periphery of the second separation chamber (Item 68) and conforming with the rotational direction of the convoluting exhaust gas mass, further raised the separation efficiency of the heavier pollutant gas stream. See FIG. 1 and FIG. 2A, Item 72. Furthermore, it was discovered that machining the sides of the eight, 3/8"×5/8" slots at the smaller end of the vortex tube to a 30 degree 'tilt' angle to the vertical axis, with the 'tilt' conforming towards the outlet pipe 72, will improve the separation efficiency of the heavier pollutant gas stream and the carbon/coal, or silicoethane or sulfur particles. See FIG. 2B. This feature of the present invention is based on the advantage accruing from the principle of "stream-lined flow of gases." Thus, the 'tilt' angle machined to the slot's side exit edges allowed the separated, heavier gases along with the carbon or lead and sulfur particles to emerge in a free flow out of the slots and collect smoothly in the delivery pipe 72 for their transmittal to the air filter assemblies. Hence, this feature of my present invention is one of the notable claims submitted.

In spite of these improvements, some of the larger particles: coal in Mines or silico-ethanes in Landfill applications, will continue to drop out into the bottom of the second separation chamber, Item 68. A manually operated, two-way, 3/8" NPT brass ball valve is installed at the bottom, in order to periodically remove such sediments in automobiles of average usage. However, an electrical solenoid-activated, 12-Volt, two-way 3/8" ball valve is available for application on high-usage automobiles, and/or diesel buses, trucks of larger engine size, in order to automatically remove such sediments at every engine switch-off. See FIG. 2A, Item 89. These utility developments of the second separation stage chamber are important features and claims of this invention.

What is claimed is:

1. An apparatus for separation of the gas components of the Ventilation Air Methane (VAM) exhaust gas from underground Coal Mines, Landfills, or Oil Refinery Fractional Distillation Towers, said apparatus comprising:
   one or more electrically driven, variable flow, adjustable discharge pressure VAM Gas Compressor(s);
   a conduit fluidly connecting the VAM compressor(s) to a first exhaust gas separating device;
   a first exhaust gas separating device that substantially separates exhaust gas into its lighter and primarily combustible components from its heavier and primarily non-combustible components;
   a conduit fluidly connecting the first exhaust separating device and a second separating device;
   a second separating device,
   said second separating device communicating with the atmosphere and having means to substantially separate the heavier non-combustible gases into a first portion comprised substantially of nitrogen and dilution air and negligibly of combustible pollutants for egress to the atmosphere; and a second portion comprised substantially of non-combustible carbon dioxide and hydrogen sulfide gases, carbon/coal, or silico-ethane or sulfur particles for separate egress to the atmosphere;
   means to feed the second portion of the heavier non-combustible gases to a plurality of in-line compressed air filter assemblies for discarding in progressive stages, the carbon dioxide, hydrogen sulfide gases, resulting in purified VAM being released to the atmosphere;
   means to feed the lighter pollutant and combustible gases separated from the first gas separation device to the engine or turbine of the apparatus;
   while said non-combustible gases of the first portion of the second separation device egress to the atmosphere from an open end of the second separation device.

2. An apparatus as set forth in claim 1, wherein said first gas separating device comprises:
   an upstream stator,
   an exhaust gas driven engine/turbine, and
   a conical vortex tube, which is open at both ends and connected at its larger end to a down stream stator, so as to receive the rotating gas discharge therefrom for separation therein into an inner gas core of said primarily combustible lighter gases moving axially towards said turbine and an outer layer of said heavier gases moving axially in the opposite direction for separation in said second separating device into said primarily combustible and non-combustible gas and said means for conducting said lighter gases of said inner core from said conical vortex tube to an air intake of the internal combustion engine/turbine,
   and a hollow shaft for support of said turbine communicating with said vortex tube at the inner core region thereof.

3. An apparatus as set forth in claim 1, wherein said first gas separating device comprises:
   an upstream stator,
   an exhaust gas driven turbine, and
   a conical vortex tube, which is open at both ends and connected at its larger end to a down stream stator, so as to receive the rotating gas discharge therefrom for separation therein into an inner gas core of said primarily combustible lighter gases moving axially towards said turbine and an outer layer of said heavier gases moving axially in the opposite direction for separation in said second separating device into said primarily combustible and non-combustible gases.

4. An apparatus as set forth in claim 1, said second separating device comprising:
   a plurality of elongated, horizontal machined slots on the smaller end of said vortex tube;
   means for a gas collector chamber comprising a cylindrical shell, centrally mounted over said slots;
   said gas collector chamber provided with a converging gas exit tube mounted peripherally and tangentially to the cylindrical shell of the gas collector chamber and centrally located over the slots, thereby affording improved streamlined flow of the outer convoluting layer of heavier gases into the plurality of in-line compressed air filter assemblies.

5. An apparatus as set forth in claim 1, said second separating device comprising:
   a plurality of elongated, horizontal slots machined at an angle of 30 degrees to the vertical axis, on the smaller end of said vortex tube;
   means for a gas collector chamber comprising a cylindrical shell centrally mounted over said slots;
   and said gas collector chamber provided with a converging gas exit tube mounted peripherally and tangentially to the cylindrical shell of the gas collector chamber and located centrally over the slots, in order to tangentially tilt the outflow of the convoluting heavier gases towards the gas collector chamber's exit tube;
   thereby further streamlining and enhancing the heavier gas and particles flow into the plurality of in-line compressed air filter assemblies.

6. An apparatus as set forth in claim 1, said separating device comprising:
   a plurality of elongated, horizontal slots machined at an angle of 30 degrees to the vertical axis, on the smaller end of the said vortex tube;
   means for a gas collector chamber comprising a cylindrical shell, centrally mounted over said slots;
   said gas collector chamber provided with a converging gas exit tube mounted peripherally and tangentially to the cylindrical shell of the gas collector chamber and located centrally over said slots;
   means for the interior surfaces of the gas collector chamber and exit tube to be completely coated with a friction reducing, high temperature, abrasion resistant thermosetting and organic industrial coating;
   thereby further improving the streamlined and smooth, out-flow of the outer layer of heavier gases to the plurality of in-line compressed air filter assemblies.

7. An apparatus as set forth in claim 1, including an internal combustion engine/turbine operating with concentrated VAM at 45 to 90 pounds per square inch pressure, in combination therewith and having a cooling radiator and comprising;
   a bearing support means for said turbine;
   means for conducting cooling fluid from said radiator to said bearing support means;
   means for the return of cooling fluid to said radiator, after the cooling of said bearing support means;
   thereby reducing the bearing working temperature and achieving higher system turbine speeds resulting in the improved separation of said lighter and heavier pollutant gases for recycling in to the internal combustion engine/turbine of the apparatus.

8. An apparatus as set forth in claim 1, wherein the VAM Compressor(s) are of the centrifugal or rotary screw type, with each device or plurality of devices, as may be required to fully energize these devices.

9. An apparatus as set forth in claim 1, wherein the sulfide gases comprise heavier coal, carbon, silico-ethane, or sulfur particles.

10. An apparatus as set forth in claim 1, said second separating device comprising:
    a plurality of elongated, horizontal slots machined on the smaller end of the vortex tube, so as to afford a streamlined egress of the outer layer of heavier gases into a gas collector chamber surrounding the slotted area, whereby the outer layer of heavier gases passing through said vortex tube exit therefrom through said slotted area into said gas collector chamber;
    means for return of the heavier gases to the plurality of in-line compressed air filter assemblies for discarding in progressive stages, while the relatively lighter inner core of primarily dilution air, nitrogen, and traces of ethane gas along with water vapor of said heavier outer layer, egress to the atmosphere at the vortex tube small end.

11. An apparatus as set forth in claim 10, wherein the heavier gases comprise coal/carbon, silico-ethane or sulfur particles.

12. An apparatus as set forth in claim 10, wherein the gas impurities comprise coal/carbon, silico-ethane, or sulfur particles.

13. An apparatus for separation of gas components of Ventilation Air Methane (VAM) exhaust gas from underground Coal Mines, Landfills, or Oil Refinery Fractional Distillation Towers, said apparatus comprising:
    a rotational device;
    means for feeding a VAM exhaust gas mixture at pre-adjustable pressure thereto, to be rotated thereby to effect a rotational directional speed of gas mixture passing there-through greater than the speed of exhaust gas mixture fed to the device;
    a vortex tube connected to said rotational device for receiving rotating exhaust gases there-from to be stratified therein into a heavier outer layer of mixed combustible gases and particulate matter (PM) and non-combustible and a lighter inner core of primarily combustible gases;
    means for feeding said inner core gases to the internal combustion engine/turbine of the apparatus to be burned therein;
    means for separating said heavier outer layer into substantially heavier non-combustible gases and substantially lighter non-combustible gases which egress through open end of vortex cone;
    means comprising a horizontal, elongated slotted area of vortex tube, through which area said heavier non-combustible gases leave said vortex tube;
    means for removal of the heavier coal/carbon or silco-ethane or sulfur particles collecting in a gas collector chamber surrounding the slotted area of vortex tube;
    means for purifying said heavier non-combustible gases of its PM by their passage through a plurality of in-line compressed air filter assemblies, wherein the PM are discarded; and
    means for exhausting said latter non-combustible gases from said vortex tube to the atmosphere.

14. An apparatus as set forth in claim 13, wherein said vortex tube is tapered to increase the rotational speed of the gases therein; the larger end thereof being connected to said rotational device and the smaller end being open for exhausting said non-combustible gases;

said horizontal, elongated slotted area being located adjacent to said smaller open end of vortex tube, benefits from the significantly increased exhaust gases' convoluting speed as they approach the second separation stage at the slotted area in the smaller end of the vortex tube;

thereby improving the separation amount of the heavier non-combustible gases and PM from the lighter non-combustible gases.

15. An apparatus as set forth in claim 13, including one or more electrically driven, variable flow, adjustable discharge pressure VAM Gas Compressor(s) in combination with said apparatus and said rotational device being a turbine connected thereto for tangential exhaust gas feed thereto and axial flow therefrom to said vortex tube and said rotational device connected thereto to be driven by the exhaust VAM gas mixture thereof.

16. An apparatus as set forth in claim 13, wherein the heavier gases comprise coal/carbon, silico-ethane, or sulfur particles.

17. An apparatus as set forth in claim 13, wherein the lighter gases comprise dilution air or nitrogen.

* * * * *